United States Patent
Choi

(10) Patent No.: US 10,389,823 B2
(45) Date of Patent: Aug. 20, 2019

(54) METHOD AND APPARATUS FOR DETECTING NETWORK SERVICE

(71) Applicant: ELECTRONICS AND TELECOMMUNICATIONS RESEARCH INSTITUTE, Daejeon (KR)

(72) Inventor: Yun-Chul Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 234 days.

(21) Appl. No.: 15/440,397

(22) Filed: Feb. 23, 2017

(65) Prior Publication Data

US 2017/0359426 A1 Dec. 14, 2017

(30) Foreign Application Priority Data

Jun. 10, 2016 (KR) .................. 10-2016-0072106

(51) Int. Cl.
*G06F 15/173* (2006.01)
*H04L 29/08* (2006.01)
*H04L 12/46* (2006.01)

(52) U.S. Cl.
CPC .......... *H04L 67/16* (2013.01); *H04L 12/4641* (2013.01); *H04L 67/10* (2013.01); *H04L 67/1002* (2013.01)

(58) Field of Classification Search
CPC ..... H04L 67/16; H04L 67/1002; H04L 67/10; H04L 12/4641
See application file for complete search history.

(56) References Cited

U.S. PATENT DOCUMENTS 9,806,979 B1 * 10/2017 Felstaine ............. G06F 11/2002
2013/0160006 A1 6/2013 Jeong et al.
(Continued)

FOREIGN PATENT DOCUMENTS

KR 10-2012-0068279 6/2012
KR 10-2015-0132774 11/2015

OTHER PUBLICATIONS

Runyu Shi et al., "MDP and Machine Learning-Based Cost-Optimization of Dynamic Resource Allocation for Network Function Virtualization," IEEE International Conference on Services Computing, 2015, pp. 65-73.

*Primary Examiner* — John B Walsh
(74) *Attorney, Agent, or Firm* — Kile Park Reed & Houtteman PLLC

(57) ABSTRACT

Disclosed herein are a method and apparatus for detecting a network service. The network service detection method includes generating pieces of required resource information for respective Virtual Network Functions (VNFs) with respect to one or more VNFs provided by a network, generating multiple deployment combinations by deploying the one or more VNFs on multiple servers constituting the network, calculating deployment combination resources required by respective multiple deployment combinations, based on the pieces of required resource information for respective VNFs, and detecting an executable deployment combination, among the multiple deployment combinations, as a network service that is capable of being provided by the network by comparing the deployment combination resources with pieces of specification information corresponding to the multiple servers.

18 Claims, 13 Drawing Sheets

(56) References Cited

U.S. PATENT DOCUMENTS

| | | |
|---|---|---|
| 2014/0376555 A1 | 12/2014 | Choi, II et al. |
| 2016/0006696 A1* | 1/2016 | Donley ............... H04L 63/0236 709/223 |
| 2017/0277531 A1* | 9/2017 | McGrath .................... G06F 8/65 |
| 2018/0077020 A1* | 3/2018 | Li ........................... H04L 29/06 |
| 2018/0176088 A1* | 6/2018 | Ellappan ............. H04L 41/0893 |

* cited by examiner $$SP = \begin{bmatrix} \backslash & VNF1 & VNF2 \\ PN1 & 0\,|\,1 & 0\,|\,1 \\ PN2 & 0\,|\,1 & 0\,|\,1 \end{bmatrix} \overset{210}{\phantom{X}}$$

$$SP = \begin{bmatrix} PN1_{vm1} & PN1_{vm2} & PN1_{vm3} & PN1_{vm4} \\ PN2_{vm1} & PN2_{vm2} & PN2_{vm3} & PN2_{vm4} \\ PN3_{vm1} & PN3_{vm2} & PN3_{vm3} & PN3_{vm4} \end{bmatrix} \overset{220}{\phantom{X}}$$

FIG. 2

$$R = \begin{bmatrix} \backslash & param1 & param2 \\ VNF1 & (value) & (value) \\ VNF2 & (value) & (value) \end{bmatrix} \overset{310}{\phantom{X}}$$

$$R = \begin{bmatrix} vm1_{cpu} & vm1_{ram} & vm1_{storage} & vm1_{net} \\ vm2_{cpu} & vm2_{ram} & vm2_{storage} & vm2_{net} \\ vm3_{cpu} & vm3_{ram} & vm3_{storage} & vm3_{net} \\ vm4_{cpu} & vm4_{ram} & vm4_{storage} & vm4_{net} \end{bmatrix} \overset{320}{\phantom{X}}$$

FIG. 3

$$C = \begin{bmatrix} \backslash & \text{param1} & \text{param2} \\ PN1 & \text{(value)} & \text{(value)} \\ PN2 & \text{(value)} & \text{(value)} \end{bmatrix} \overset{410}{\phantom{xx}}$$

$$C = \begin{bmatrix} PN1c_{cpu} & PN1c_{ram} & PN1c_{storage} & PN1c_{net} \\ PN2c_{cpu} & PN2c_{ram} & PN2c_{storage} & PN2c_{net} \\ PN3c_{cpu} & PN3c_{ram} & PN3c_{storage} & PN3c_{net} \end{bmatrix} \overset{420}{\phantom{xx}}$$

FIG. 4

NS_1 = VNF_1 + VNF_2
NS_2 = VNF_2 + VNF_3

FIG. 11

$ID_1$ = cpu(core)    $VNF\_1_1 = 2$    $VNF\_2_1 = 4$    $VNF\_3_1 = 1$
$ID_2$ = ram(GB)      $VNF\_1_2 = 4$    $VNF\_2_2 = 8$    $VNF\_3_2 = 2$
$ID_3$ = storage(GB)  $VNF\_1_3 = 100$  $VNF\_2_3 = 50$   $VNF\_3_3 = 10$
$ID_4$ = storage(MB)  $VNF\_1_4 = 500$  $VNF\_2_4 = 500$  $VNF\_3_4 = 100$

FIG. 12

NS affinity rule

Affinity Rules
  NS_2(VNF_2, VNF_3 same host)

FIG. 13 vm1 -> NS1_vnf1     vm2 -> NS1_vnf2
vm3 -> NS2_vnf2     vm4 -> NS2_vnf3

$$SP = \begin{bmatrix} PN1_{vm1} & PN1_{vm2} & PN1_{vm3} & PN1_{vm4} \\ PN2_{vm1} & PN2_{vm2} & PN2_{vm3} & PN2_{vm4} \\ PN3_{vm1} & PN3_{vm2} & PN3_{vm3} & PN3_{vm4} \end{bmatrix}$$

$$R = \begin{bmatrix} vm1_{cpu} & vm1_{ram} & vm1_{storage} & vm1_{net} \\ vm2_{cpu} & vm2_{ram} & vm2_{storage} & vm2_{net} \\ vm3_{cpu} & vm3_{ram} & vm3_{storage} & vm3_{net} \\ vm4_{cpu} & vm4_{ram} & vm4_{storage} & vm4_{net} \end{bmatrix}$$

$$C = \begin{bmatrix} PN1c_{cpu} & PN1c_{ram} & PN1c_{storage} & PN1c_{net} \\ PN2c_{cpu} & PN2c_{ram} & PN2c_{storage} & PN2c_{net} \\ PN3c_{cpu} & PN3c_{ram} & PN3c_{storage} & PN3c_{net} \end{bmatrix}$$

FIG. 14

```
C - (SP x R) = result
if result element > 0 then
    if sp = LEAF then
        select sp
    else
        continue
else if result element = 0 then
    if sp = LEAF then
        select sp
    else
        continue
else
    remove node
```

FIG. 15

$$C = \begin{bmatrix} 8 & 32 & 10000 & 10000 \\ 8 & 32 & 10000 & 10000 \\ 8 & 32 & 10000 & 10000 \end{bmatrix}$$

FIG. 16

$$R = \begin{bmatrix} 2 & 4 & 100 & 500 \\ 4 & 8 & 50 & 500 \\ 4 & 8 & 50 & 500 \\ 1 & 2 & 10 & 100 \end{bmatrix}$$

FIG. 17

METHOD AND APPARATUS FOR DETECTING NETWORK SERVICE

CROSS REFERENCE TO RELATED APPLICATION

This application claims the benefit of Korean Patent Application No. 10-2016-0072106, filed Jun. 10, 2016, which is hereby incorporated by reference in its entirety into this application.

BACKGROUND OF THE INVENTION

1. Technical Field

The present invention relates to technology, which detects an executable network service in advance so that a problem of resource allocation does not occur when a network service is implemented using Network Function Virtualization (NFV) technology.

2. Description of the Related Art

Since existing network service providers consider stability to be the most important goal, a system is configured such that factors causing failure are minimized by executing a single application on a single hardware component. Therefore, backup equipment may also be operated to immediately respond to a failure when such a failure occurs.

However, when equipment is operated using this method, there is a disadvantage in that the utilization rate of the equipment is deteriorated and power consumption is increased. Further, when a network service provider increases the number of pieces of equipment so as to provide various types of services as the situation in which consumers require various types of services increases, a problem occurs in which the utilization rate of the equipment is further decreased and power consumption is further increased.

To solve this problem, a scheme for improving the utilization rate of equipment using Network Function Virtualization (NFV) technology has been considered.

NFV technology, which is technology for supporting the opening and virtualization of networks to construct networks and service infrastructures, is configured to implement a single network service by virtually installing, combining, and executing required network functions depending on traffic. By means of this, the network service may be configured in a timely manner by virtualizing network functions, and may be actively controlled depending on the situation.

When NFV technology is utilized, network functions may be actively controlled depending on the situation by adding a network service function, and Virtualized (or Virtual) Network Functions (VNFs) may be deployed in consideration of power consumption or equipment usage.

However, when this technology is used, there is a disadvantage in that it is difficult to guarantee the stability of a network service, which is considered by a network service provider to be the most important factor. One of the methods for solving this problem is a verification system. Such a verification system may improve the stability of equipment by checking whether interoperation with other VNFs is normally performed before a certain VNF is executed on the equipment, or checking whether event processing has been applied in conformity with a policy during execution of the VNF.

In connection with this, Korean Patent Application Publication No. 10-2012-0068279 discloses a technology related to "The automated test bed system using virtual network."

SUMMARY OF THE INVENTION

Accordingly, the present invention has been made keeping in mind the above problems occurring in the prior art, and an object of the present invention is to provide an algorithm, which solves the problem of resource allocation that may occur when a network function or service is virtualized and is executed on a high-performance large-capacity server.

Another object of the present invention is to efficiently detect an optimal executable combination depending on available resources, among all combinations deployable on a network.

A further object of the present invention is to minimize search time by performing a search based on a tree structure and by excluding combinations having no possibility of being executed in advance.

In accordance with an aspect of the present invention to accomplish the above object, there is provided a method for detecting a network service, including generating pieces of required resource information for respective Virtual Network Functions (VNFs) with respect to one or more VNFs provided by a network; generating multiple deployment combinations by deploying the one or more VNFs on multiple servers constituting the network; calculating deployment combination resources required by respective multiple deployment combinations, based on the pieces of required resource information for respective VNFs; and detecting an executable deployment combination, among the multiple deployment combinations, as a network service that is capable of being provided by the network by comparing the deployment combination resources with pieces of specification information corresponding to the multiple servers.

Generating the multiple deployment combinations may include generating a deployment combination tree corresponding to the multiple deployment combinations in such a way as to sequentially match depths of a tree with the one or more VNFs, and detecting the network service by searching the deployment combination tree using a breadth-first search method.

Calculating the deployment combination resources may include generating multiple deployment combination resource matrices corresponding to multiple deployment combinations by multiplying multiple deployment combination matrices indicating the multiple deployment combinations by resources matrices corresponding to the pieces of required resource information for respective VNFs.

Detecting the executable deployment combination may include generating a server specification matrix in which the multiple servers are set to values of rows and one or more virtual resource modules included in the specification information are set to values of columns; and removing a node corresponding to a deployment combination resource matrix, in which a matrix value greater than a matrix value of the server specification matrix is present, from the deployment combination tree.

Detecting the executable deployment combination may be configured to detect the network service corresponding to at least one leaf node remaining without being removed after the deployment combination tree has been searched.

Generating the multiple deployment combinations may be configured to match depths of the tree with the one or more VNFs in consideration of dependency between the one or more VNFs, based on Network Function Virtualization (NFV) policies.

Removing the node may be configured, based on an affinity between the one or more VNFs included in the NFV policies, to remove a node corresponding to a deployment combination resource matrix that violates the affinity from the multiple deployment combination resource matrices.

The NFV policies may include details related to at least one of an affinity, a scale, a dependency, High Availability (HA), an instance, a Forwarding Graph (FG), and a virtual link (vlink).

Generating the multiple deployment combinations may be configured to generate the deployment combination tree in consideration of energy efficiency, load balancing, a network delay, or a hardware error probability, which are included in a network function virtualization infrastructure policy.

The method may further include acquiring information about available resources through the one or more virtual resource modules by considering a larger value of an amount of use of the one or more virtual resource modules monitored on the network and an amount of use of actually allocated resources; and setting the specification information to correspond to the available resource information.

In accordance with another aspect of the present invention to accomplish the above object, there is provided an apparatus for detecting a network service, including a required resource information generation unit for generating pieces of required resource information for respective Virtual Network Functions (VNFs) with respect to one or more VNFs provided by a network; a deployment combination generation unit for generating multiple deployment combinations by deploying the one or more VNFs on multiple servers constituting the network; a deployment combination resource calculation unit for calculating deployment combination resources required by respective multiple deployment combinations, based on the pieces of required resource information for respective VNFs; and a network service detection unit for detecting an executable deployment combination, among the multiple deployment combinations, as a network service that is capable of being provided by the network by comparing the deployment combination resources with pieces of specification information corresponding to the multiple servers.

The deployment combination generation unit may generate a deployment combination tree corresponding to the multiple deployment combinations in such a way as to sequentially match depths of a tree with the one or more VNFs, and detect the network service by searching the deployment combination tree using a breadth-first search method.

The deployment combination resource calculation unit may generate multiple deployment combination resource matrices corresponding to multiple deployment combinations by multiplying multiple deployment combination matrices indicating the multiple deployment combinations by resources matrices corresponding to the pieces of required resource information for respective VNFs.

The network service detection unit may be configured to generate a server specification matrix in which the multiple servers are set to values of rows and one or more virtual resource modules included in the specification information are set to values of columns and to remove a node corresponding to a deployment combination resource matrix, in which a matrix value greater than a matrix value of the server specification matrix is present, from the deployment combination tree.

The network service detection unit may detect the network service corresponding to at least one leaf node remaining without being removed after the deployment combination tree has been searched.

The deployment combination generation unit may match depths of the tree with the one or more VNFs in consideration of dependency between the one or more VNFs, based on Network Function Virtualization (NFV) policies.

The network service detection unit may be configured, based on an affinity between the one or more VNFs included in the NFV policies, to remove a node corresponding to a deployment combination resource matrix that violates the affinity from the multiple deployment combination resource matrices.

The NFV policies may include details related to at least one of an affinity, a scale, a dependency, High Availability (HA), an instance, a Forwarding Graph (FG), and a virtual link (vlink).

The deployment combination generation unit may generate the deployment combination tree in consideration of energy efficiency, load balancing, a network delay, or a hardware error probability, which are included in a network function virtualization infrastructure policy.

The apparatus may further include an available resource information acquisition unit for acquiring information about available resources through the one or more virtual resource modules by considering a larger value of an amount of use of the one or more virtual resource modules monitored on the network and an amount of use of actually allocated resources, wherein the specification information is set to correspond to the available resource information.

BRIEF DESCRIPTION OF THE DRAWINGS

The above and other objects, features and advantages of the present invention will be more clearly understood from the following detailed description taken in conjunction with the accompanying drawings, in which:

FIG. 2 is a diagram showing an example of a deployment combination matrix according to the present invention;

FIG. 3 is a diagram showing an example of a resource matrix according to the present invention;

FIG. 4 is a diagram showing an example of a server specification matrix according to the present invention;

FIGS. 10 to 17 are diagrams showing environment configuration information required to perform the network service detection method according to an embodiment of the present invention;

DESCRIPTION OF THE PREFERRED EMBODIMENTS

Figure 1:
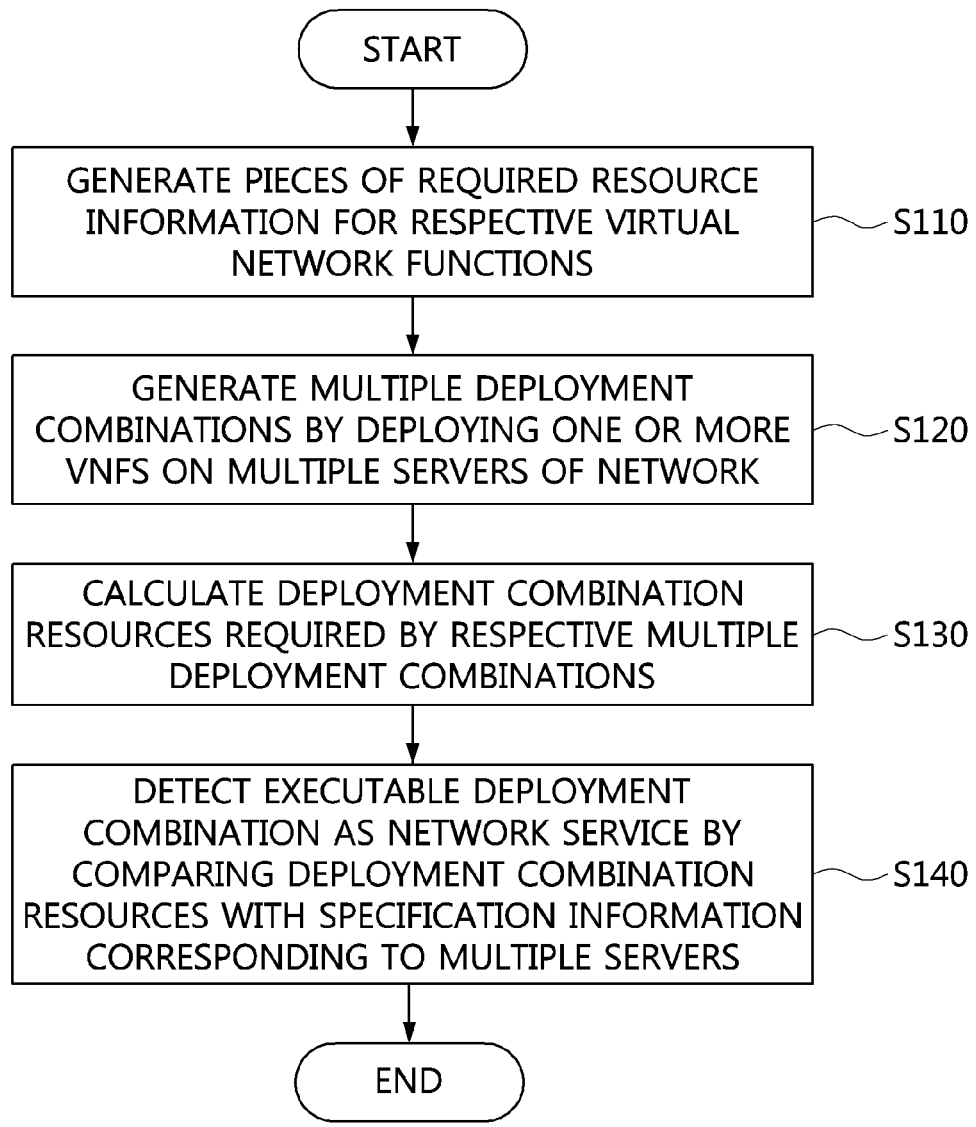
FIG. 1 is an operation flowchart showing a method for detecting a network service according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is an operation flowchart showing a method for detecting a network service according to an embodiment of the present invention.

Referring to FIG. 1, the network service detection method according to the embodiment of the present invention generates, for one or more Virtualized (or Virtual) Network Functions (VNFs) provided by a network, pieces of required resource information for respective VNFs at step S110.

Here, the term "VNF" may mean each network function that may be provided using virtual resource modules deployed on the network based on network function virtualization, for example, a virtual Central Processing Unit (CPU), virtual Random Access Memory (RAM), virtual storage, virtual network memory, etc. Here, a single network service may be implemented by suitably installing, combining, and executing VNFs.

Therefore, resources required by VNFs correspond to virtual resource modules, which are required to execute the VNFs. For example, the number of CPUs, RAM capacity, storage capacity, and network memory capacity required to execute a first VNF may correspond to the required resource information corresponding to the first VNF.

Here, for all VNFs provided by the network, required resource information may be acquired, as in the case of the example, and thus pieces of required resource information for respective VNFs may be generated.

Further, the network service detection method according to the embodiment of the present invention generates multiple deployment combinations by deploying one or more VNFs in multiple servers constituting the network at step S120.

For example, deployment combinations that can be generated by deploying VNF1, VNF2, and VNF3 in a first server may correspond to (VNF1), (VNF2), (VNF3), (VNF1-VNF2), (VNF1-VNF3), (VNF2-VNF1), (VNF2-VNF3), (VNF3-VNF1), (VNF3-VNF2), (VNF1-VNF2-VNF3), (VNF1-VNF3-VNF2), (VNF2-VNF1-VNF3), (VNF2-VNF3-VNF1), (VNF3-VNF1-VNF2), and (VNF3-VNF2-VNF1).

That is, all deployment combinations may be generated in consideration of the number and the deployment sequence of VNFs.

In this case, a deployment combination tree corresponding to multiple deployment combinations may be generated in such a way as to sequentially match the depths of the tree with one or more VNFs, and the network service may be detected by searching the deployment combination tree using a breadth-first search method.

For example, if the number of network function virtualization infrastructures, that is, servers, increases, or if the number of VNFs that can be provided by the network increases, the investigation of all of multiple deployment combinations may be a very inconvenient or impossible task.

Therefore, the number of deployment combinations to be searched may be remarkably reduced by connecting the multiple deployment combinations in the form of a tree structure, as in the case of the deployment combination tree, and performing a search, thus improving system efficiency. That is, the number of cases may be reduced using a method for first searching upper nodes in the deployment combination tree using a breadth-first search method and removing nodes belonging to a deployment combination, to which resources cannot be allocated, from the upper nodes.

Here, it is possible to match the depths of the tree with one or more VNFs in consideration of dependency between the one or more VNFs, based on NFV policies.

For example, if it is assumed that a first network service is composed of VNF1, VNF2, VNF3, and VNF4, and details related to the dependency are included in the NFV policies to correspond to (VNF3 depends on VNF4 and VNF1), (VNF4 depends on VNF2), and (VNF1 depends on VNF2), the depths of the tree may match VNFs in the sequence of (VNF2-VNF1-VNF4-VNF3) or in the sequence of (VNF2-VNF4-VNF1-VNF3).

Here, the NFV policies may include details related to at least one of an affinity, a scale, a dependency, High Availability (HA), an instance, a Forwarding Graph (FG), and a virtual link (vlink).

In this case, a policy related to affinity is represented in the form of a matrix, and an AND operation on respective rows of the affinity policy and respective rows of a deployment combination matrix is performed, and thus it may be determined whether affinity is satisfied. Further, an instance, scale, and HA enable verification to be performed by expanding the columns of the deployment combination matrix. Furthermore, FG and vlink are components included in network attributes, and may require the expansion and modeling of a network or the change of existing modeling.

Here, the deployment combination tree may be generated in consideration of energy efficiency, load balancing, network delay, probability of hardware error, etc., which are included in a network function virtualization infrastructure policy.

In this case, the network function virtualization infrastructure policy may be solved by applying an existing algorithm, such as a Markov Decision Processes (MDP) algorithm.

For example, the probability that the MDP algorithm will be applied to machine learning may be calculated using an equipment error value, and the cost may also be applied in consideration of energy efficiency, load balancing, and network delay. Further, when a tree is generated, the probability and cost of the link may be additionally considered.

Further, the network service detection method according to an embodiment of the present invention calculates deployment combination resources required by each of multiple deployment combinations based on pieces of required resource information for respective VNFs at step S130.

That is, when the above example is used, a total of 15 deployment combination resources may be calculated by applying pieces of required resource information for respective VNFs to (VNF1), (VNF2), (VNF3), (VNF1-VNF2), (VNF1-VNF3), (VNF2-VNF1), (VNF2-VNF3), (VNF3-VNF1), (VNF3-VNF2), (VNF1-VNF2-VNF3), (VNF1-VNF3-VNF2), (VNF2-VNF1-VNF3), (VNF2-VNF3-VNF1), (VNF3-VNF1-VNF2), and (VNF3-VNF2-VNF1), which correspond to deployment combinations that can be generated by deploying VNF1, VNF2, and VNF3 in the first server.

Here, multiple deployment combination resource matrices, corresponding to multiple deployment combinations, may be generated by individually multiplying multiple deployment combination matrices, indicating multiple deployment combinations, by a resource matrix corresponding to the pieces of required resource information for respective VNFs. This procedure will be described in detail with reference to FIGS. 10 to 18.

Further, the network service detection method according to the embodiment of the present invention compares deployment combination resources with specification information corresponding to multiple servers, and thus detects executable deployment combinations, among the multiple deployment combinations, as network services that can be provided over the network at step S140.

Here, among the multiple deployment combinations, deployment combinations, the specification information of which satisfies deployment combination resources and which are executable, may be classified as a green zone, and deployment combinations, the specification information of which does not satisfy deployment combination resources and which are not executable, may be classified as a dead zone. Based on this modeling scheme, it may be checked whether resources may be allocated for respective network services corresponding to deployment combinations.

Here, a server specification matrix, in which multiple servers are set to row values and one or more virtual resource modules included in the specification information are set to column values, may be generated.

Further, the server specification matrix may be generated by setting hosts, instead of the multiple servers, to row values.

Here, a node corresponding to a deployment combination resource matrix, in which a matrix value greater than that of the server specification matrix is present, may be removed from the deployment combination tree.

For example, when a matrix value corresponding to the CPU of the first server in the server specification matrix is assumed to be 2, if the matrix value corresponding to the CPU of the first server, among the deployment combination resource matrices, exceeds 2, the node corresponding to the deployment combination resource matrix may be removed. That is, since more CPU cores than CPU cores that can be provided by the first server are required, it may be determined that the corresponding deployment combination cannot be executed on the network.

Here, the node corresponding to a deployment combination resource matrix that violates affinity may be removed from the multiple deployment combination resource matrices, based on affinity between the one or more VNFs included in the network function virtualization policies.

For example, it may be assumed that there is a first network service composed of VNF1 and VNF2, that is, (VNF1-VNF2), and VNF1 and VNF2 must be allocated to the same server or the same host based on the affinity policy. Here, nodes corresponding to deployment combinations in which VNF1 and VNF2 are not allocated to the same server or the same host may be removed from all deployment combinations related to the first network service.

Here, a network service may be detected to correspond to at least one leaf node that remains without being removed after searching the deployment combination tree. This operation will be described in detail later with reference to FIG. 19.

Further, although not shown in FIG. 1, the network service detection method according to the embodiment of the present invention acquires information about available resources through one or more virtual resource modules in consideration of the larger value of the amount of use of one or more virtual resource modules, which is monitored on the network, and the amount of use of actually allocated resource modules.

That is, since there may occur the difference between the amount of use of resource modules allocated by the network to the server or host and the amount of use of resource modules detected via monitoring, information about available resources may be acquired in consideration of the larger value of the two types of amount of use so as to guarantee the stability of the system.

Here, available resource information for each of one or more virtual resource modules may be acquired.

Although not shown in FIG. 1, the network service detection method according to an embodiment of the present invention sets specification information to correspond to the available resource information.

By means of the network service detection apparatus, it is possible to provide an algorithm, which solves the problem of resource allocation that may occur when a network function or service is virtualized and is executed on a high-performance large-capacity server.

Further, it is possible to efficiently detect an optimal executable combination depending on available resources, among all combinations deployable on a network.

Furthermore, it is possible to minimize search time by performing a search based on a tree structure and by excluding combinations having no possibility of being executed in advance.

FIG. 2 is a diagram showing examples of a deployment combination matrix according to the present invention.

Referring to FIG. 2, a deployment combination matrix 210 according to the present invention, that is, a Scheduling Plan (SP), may be generated by deploying physical nodes, which mean servers or hosts, in the rows of the matrix and by deploying VNFs in the columns of the matrix.

Here, a matrix value is given as a binary value in such a way that a matrix value of 0 may mean that a VNF is not deployed, whereas a matrix value of 1 may mean that a VNF is deployed, or vice versa.

For example, when three physical nodes PN, corresponding to PN1, PN2, and PN3, are present, and four VNFs are present, a deployment combination matrix, such as that of reference numeral 220, may be generated.

Here, the term "VM", indicating a virtual machine, may be used to have the same meaning as a VNF.

FIG. 3 is a diagram showing examples of a resource matrix according to the present invention.

Referring to FIG. 3, a resource matrix 310, that is, R, according to the present invention may be generated by deploying VNFs in the rows of the matrix and deploying parameters for virtual resource modules in the columns of the matrix.

For example, when four VNFs or VMs are present, and virtual resource modules corresponding to a CPU, RAM, storage, and a network, respectively, are present, a resource matrix such as that of reference numeral 320 may be generated.

FIG. 4 is a diagram showing examples of a server specification matrix according to the present invention.

Referring to FIG. 4, a server specification matrix 410 according to the present invention, that is, Capacity (C), may be generated by deploying physical nodes (PN), which mean servers or hosts, in the rows of the matrix and by deploying parameters for virtual resource modules in the columns of the matrix.

For example, when there are three physical nodes (PN), corresponding to PN1, PN2, and PN3, and there are virtual resource modules corresponding to a CPU, RAM, storage, and a network, respectively, a server specification matrix such as that of reference numeral 420 may be generated.

Figures 5, 6:
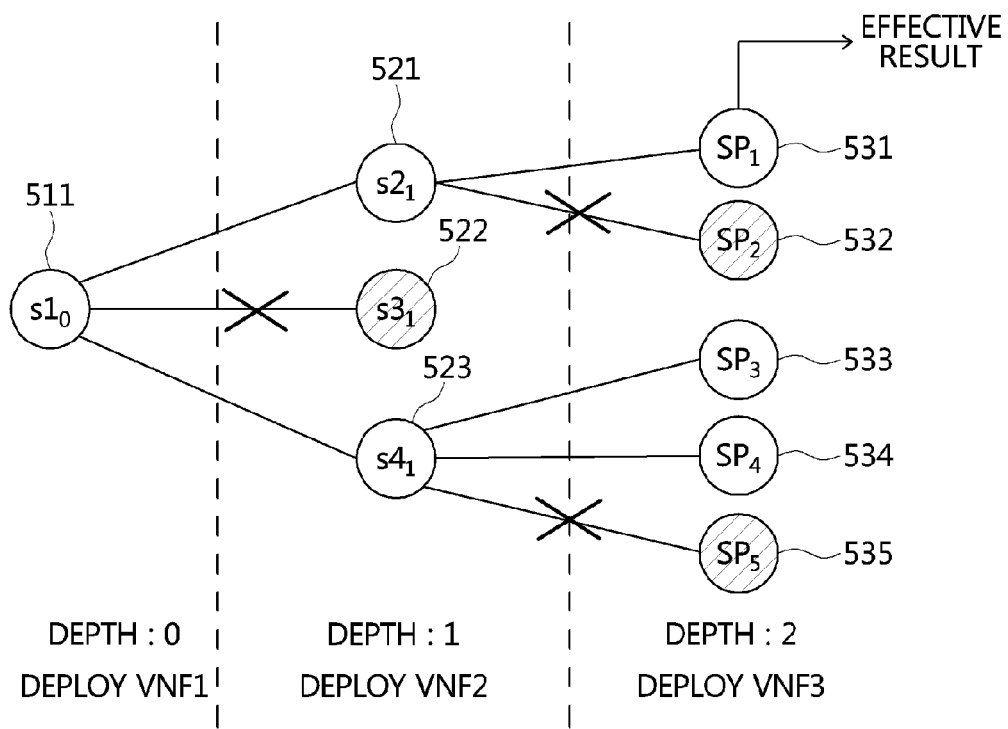
FIG. 5 is a diagram showing an example of a deployment combination tree according to the present invention.
FIG. 6 is a diagram showing an example of an affinity policy, which is indicated in the form of a matrix, among network function virtualization policies, according to the present invention.

FIG. 5 is a diagram showing an example of a deployment combination tree according to the present invention.

Referring to FIG. 5, a deployment combination tree according to the present invention may be generated by matching VNFs with the respective depths of the tree. In this way, it is possible to determine whether resources may be allocated to the corresponding deployment combination while the deployment combination tree is generated by representing the multiple deployment combinations in the form of a deployment combination tree, thus greatly decreasing the number of deployment combination cases.

That is, while a deployment combination tree is sequentially generated from nodes ranging from a node corresponding to a deployment combination 511, and it is determined that it is impossible to allocate resources to a deployment combination 522, the generation of the tree of the corresponding node is stopped, and the process may proceed to a subsequent node.

By progressing in this way, the deployment combination tree is generated, so that only effective deployment combinations, to which resources may be allocated, finally remain, thus enabling a network service usable in the network to be naturally detected.

FIG. 6 is a diagram showing an example of an affinity policy, which is indicated in the form of a matrix, among network function virtualization policies, according to the present invention.

Referring to FIG. 6, it may be determined whether an affinity policy matrix 610 indicating an affinity policy, among network function virtualization policies according to the present invention, is satisfied by performing an AND operation on the rows of the affinity policy matrix 610 and the rows of a deployment combination matrix. In this case, when the result of performing the AND operation does not satisfy the affinity policy matrix 610, the node corresponding to the deployment combination matrix may be removed.

Figure 7:
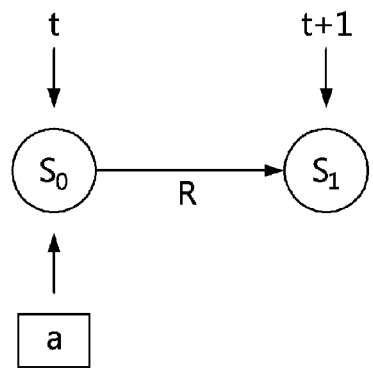
FIG. 7 is a diagram showing an example of a network function virtualization infrastructure policy according to an embodiment of the present invention.

FIG. 7 is a diagram showing an example of a network function virtualization infrastructure policy according to the present invention.

Referring to FIG. 7, the network function virtualization infrastructure policy according to the present invention may be solved by applying an existing algorithm such as a Markov Decision Processes (MDP) algorithm.

For example, the MDP algorithm may correspond to the following conditions:

MDP=$<S,A,e(A),o(A)>$

State $S=<s1 \ldots si \ldots sn>$

Action $A=<a1 \ldots ai \ldots an>$

Transition $Pa(s,s')=Pr(st+1=s'|st=s, at=a)$

Reward $Ra(s,s')$

Here, the probability that the MDP algorithm will be applied to machine learning may be calculated using an equipment error value, and the cost may also be applied in consideration of energy efficiency, load balancing, and network delay. Further, when a tree is generated, the probability and cost of the link may be additionally considered.

Figure 8:
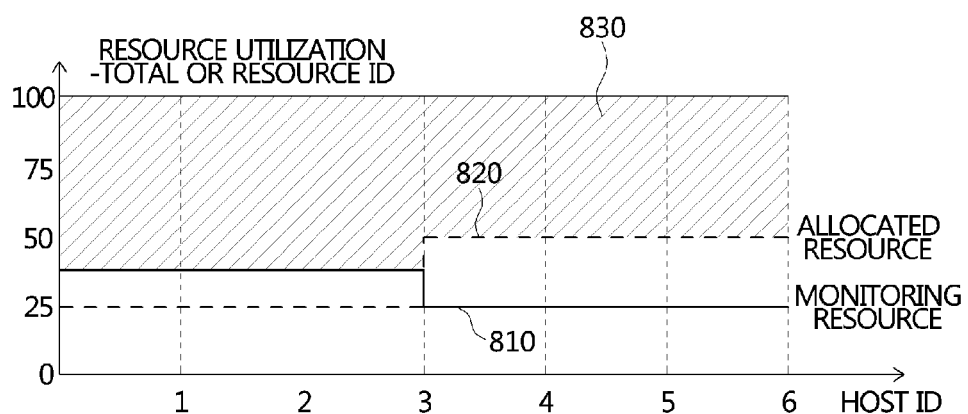
FIG. 8 is a diagram showing resources available in a network function virtualization infrastructure according to an embodiment of the present invention.

FIG. 8 is a diagram showing resources available in a network function virtualization infrastructure according to an embodiment of the present invention.

Referring to FIG. 8, a resource area that is available in a network function virtualization infrastructure according to the embodiment of the present invention, that is, a server or a host, may be known.

In the present invention, as shown in FIG. 8, an available resource area 830 is set based on the larger of the value of monitoring resources 810, which are monitored on a network, and the value of actually allocated resources 820.

Here, when respective hosts shown in FIG. 8 are checked, hosts 1 to 3 use resources exceeding the actually allocated resources 820 due to the amount of use of vlink, and hosts 4 and 5 use less resources than the actually allocated resources 820.

Therefore, based on the larger of these results, the available resource area 830 may be detected, as shown in FIG. 8.

Figure 9:
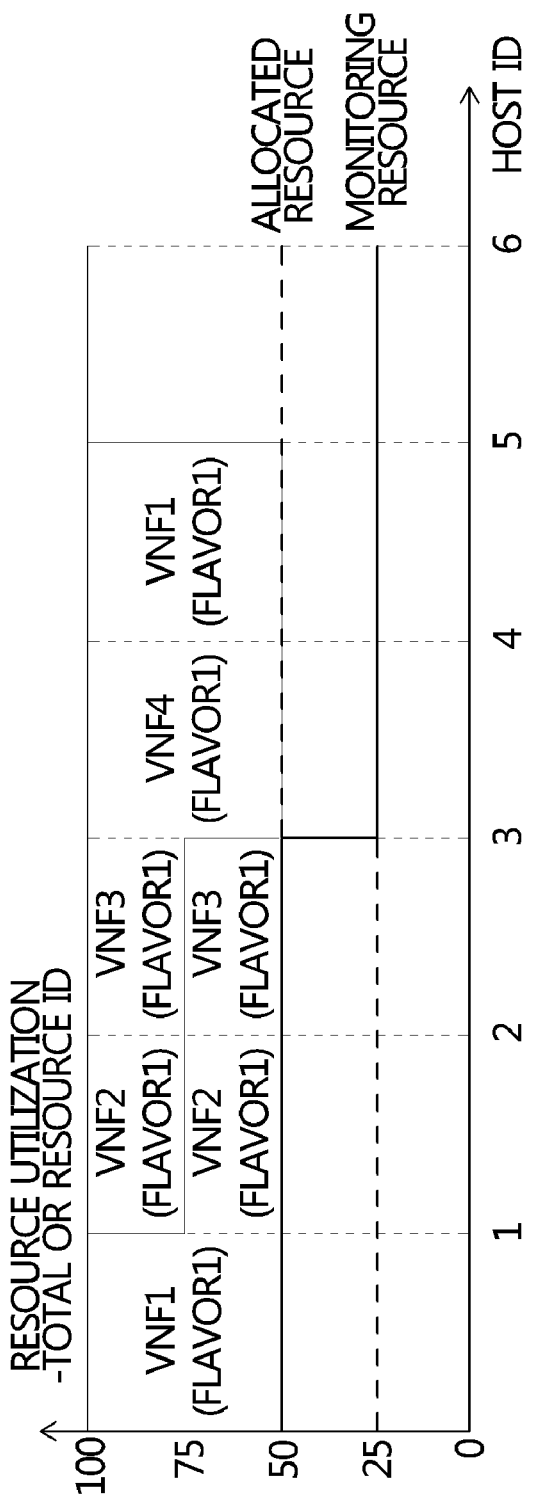
FIG. 9 is a diagram showing the configuration of a network service according to an embodiment of the present invention.

FIG. 9 is a diagram showing the configuration of a network service according to an embodiment of the present invention.

Referring to FIG. 9, it can be seen that network services according to an embodiment of the present invention have flavor lists for VNFs of respective network services.

Here, the area of VNFs ranging from hosts 1 to 3 may correspond to a first network service area, and the area of VNFs ranging from hosts 2 to 5 may correspond to a second network service area.

FIGS. 10 to 17 are diagrams showing environment configuration information required to perform a network service detection method according to an embodiment of the present invention.

Figure 10:
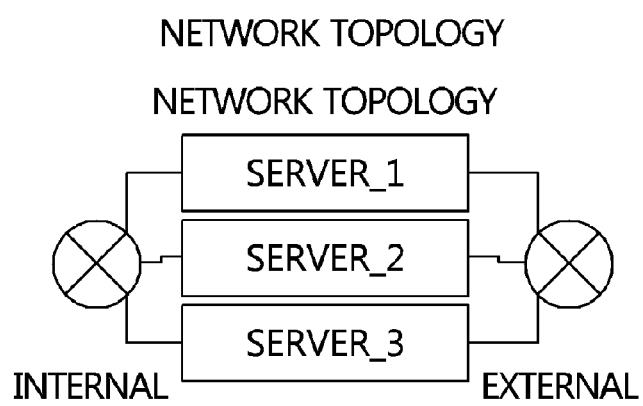

Referring to FIGS. 10 to 17, it can be seen that a network is composed of three servers, as shown in FIG. 10, and the specification of each server corresponds to a CPU having 8 cores, 32 GB RAM, 10 TB storage, and 1×2 GB network memory.

Further, as shown in FIG. 11, two network services corresponding to NS_1 and NS_2 may be provided.

Here, NS_1 may be executed using a deployment combination corresponding to VNF_1+VNF_2, and NS_2 may be executed using a deployment combination corresponding to VNF_2+VNF_3.

Further, as shown in FIG. 12, VNF_1 may require resources corresponding to a CPU having two cores, 4 GB RAM, 100 GB storage, and 500 MB network memory, VNF_2 may require resources corresponding to a CPU having four cores, 8 GB RAM, 50 GB storage, and 500 MB network memory, and VNF_3 may require resources corresponding to a CPU having one core, 2 GB RAM, 10 GB storage, and 100 MB network memory.

Furthermore, as shown in FIG. 13, as an affinity policy, details indicating that, in a network service corresponding to NS_2, VNF_2 and VNF_3 must be deployed on the same host, that is, the same server, may be defined.

Furthermore, FIG. 14 illustrates the form of a deployment combination matrix SP generated based on the environment configuration information described in FIGS. 10 to 13, the form of a resource matrix R, and the form of a server specification matrix C.

In addition, FIG. 15 illustrates an algorithm for selecting a node to which resources may be allocated while searching a deployment combination tree according to the present invention.

FIGS. 16 and 17 may correspond to matrices obtained by substituting the specification information of the server shown in FIG. 10 and pieces of required resource information for respective VNFs shown in FIG. 12 into the resource matrix R and the server specification matrix C shown in FIG. 14.

Figure 18:
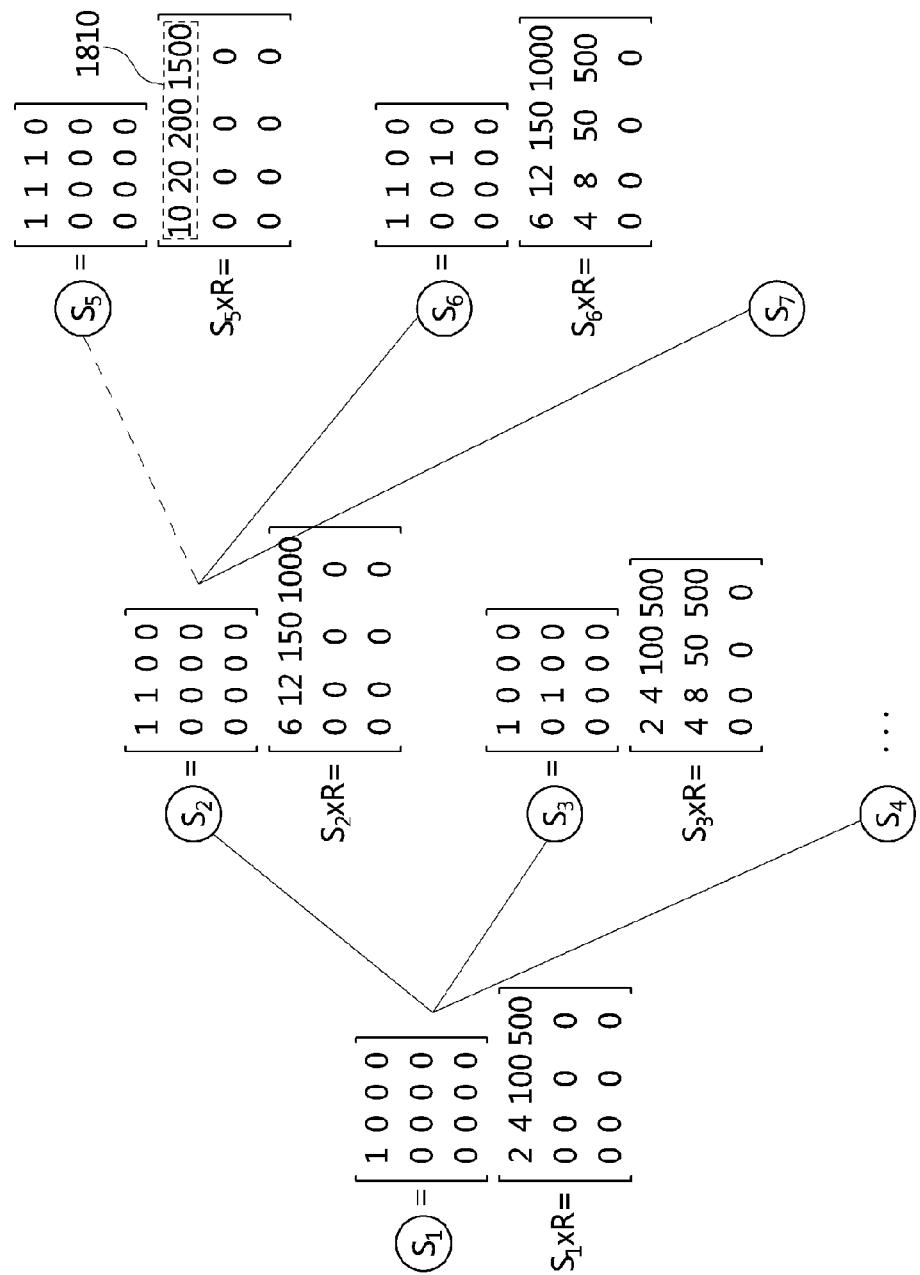
FIG. 18 is a diagram showing an example of a deployment combination tree generated based on the environment configuration information shown in FIGS. 10 to 17.

FIG. 18 is a diagram showing an example of a deployment combination tree generated based on the environment configuration information shown in FIGS. 10 to 17.

Referring to FIG. 18, it can be seen that a part of the deployment combination tree is illustrated.

That is, a deployment combination matrix $S_1$ may correspond to a matrix in which only VNF_1 is deployed on PN1. Here, since the matrix value of a deployment combination resource matrix $S_1 \times R$, which is generated by multiplying the deployment combination matrix $S_1$ by the resource matrix R, does not have a value greater than the matrix value of the server specification matrix C, resources may be allocated to the node corresponding to the deployment combination matrix $S_1$.

In this way, subsequent lower nodes are searched using a breadth-first search method, and nodes to which resources may be allocated may be left over.

Here, referring to the case of a deployment combination matrix $S_5$, the matrix value of a deployment combination resource matrix $S_5 \times R$, which is generated by multiplying the deployment combination matrix $S_5$ by the resource matrix R, has a matrix value 1810 greater than that of the server specification, and thus resources may not be allocated to a node corresponding to the deployment combination matrix $S_5$. That is, in this case, the node corresponding to the deployment combination matrix $S_5$ may be removed and a search for a subsequent node may be performed.

Figure 19:
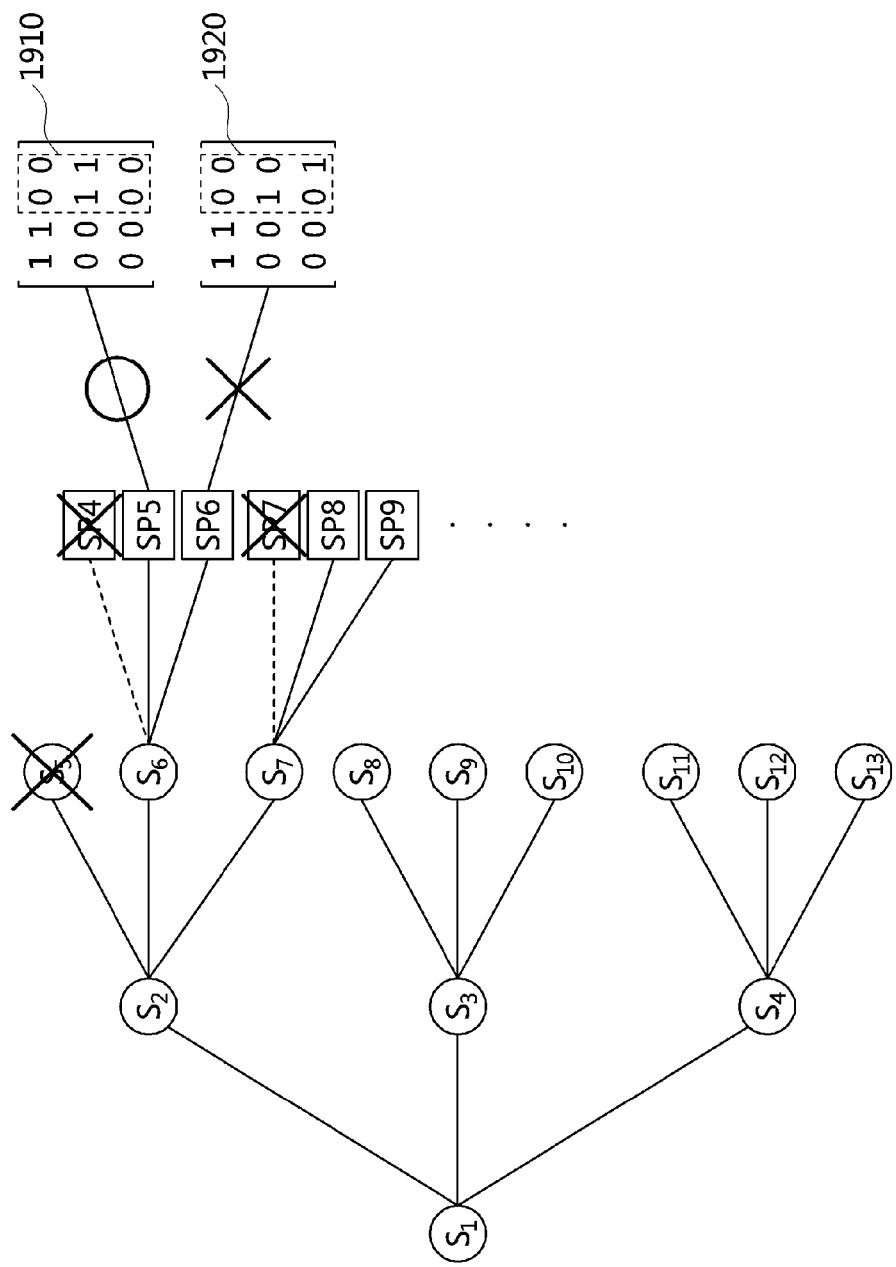
FIG. 19 is a diagram showing another example of a deployment combination tree generated based on the environment configuration information of FIGS. 10 to 17.

FIG. 19 is a diagram showing another example of a deployment combination tree generated based on the environment configuration information shown in FIGS. 10 to 17.

Referring to FIG. 19, it can be seen that, as a result of searching deployment combination matrices ranging from $S_1$ to $S_{13}$, a node corresponding to the deployment combination matrix $S_5$ and nodes corresponding to deployment combination matrices SP4 and SP7 have matrix values greater than that of the server specification, and thus the nodes may be removed.

Here, according to the environment configuration information shown in FIG. 13, as an affinity policy, VNF_2 and VNF_3 in a network service corresponding to NS_2 must be able to be deployed on the same host, that is, the same server.

However, it can be seen that, in the case of the deployment combination matrix SP6, VNF_2 and VNF_3 corresponding to the network service NS_2 are deployed on PN_2 and PN_3, respectively. Therefore, based on the affinity policy, the deployment combination matrix SP6 includes a matrix value 1920 that does not satisfy the affinity policy, and thus the corresponding node may be removed.

In contrast, in the deployment combination matrix SP5, VNF_2 and VNF_3 corresponding to NS_2 are deployed on PN_2, and thus SP5 may be determined to have a matrix value 1910 satisfying the affinity policy and may then be left over without being removed.

In accordance with the present invention, it is possible to provide an algorithm, which solves the problem of resource allocation that may occur when a network function or service is virtualized and is executed on a high-performance large-capacity server.

Further, the present invention may efficiently detect an optimal executable combination depending on available resources, among all combinations deployable on a network.

Furthermore, the present invention may minimize search time by performing a search based on a tree structure and by excluding combinations having no possibility of being executed in advance.

As described above, in the network service detection method and apparatus according to the present invention, the configurations and schemes in the above-described embodiments are not limitedly applied, and some or all of the above embodiments can be selectively combined and configured so that various modifications are possible.

What is claimed is:

1. A method for detecting a network service, comprising:
generating pieces of required resource information for respective Virtual Network Functions (VNFs) with respect to one or more VNFs provided by a network;
generating multiple deployment combinations by deploying the one or more VNFs on multiple servers constituting the network;
calculating deployment combination resources required by respective multiple deployment combinations, based on the pieces of required resource information for respective VNFs; and
detecting an executable deployment combination, among the multiple deployment combinations, as a network service that is capable of being provided by the network by comparing the deployment combination resources with pieces of specification information corresponding to the multiple servers,
wherein generating the multiple deployment combinations comprises:
generating a deployment combination tree corresponding to the multiple deployment combinations in such a way as to sequentially match depths of a tree with the one or more VNFs, and detecting the network service by searching the deployment combination tree using a breadth-first search method.

2. The method of claim 1, wherein calculating the deployment combination resources comprises generating multiple deployment combination resource matrices corresponding to multiple deployment combinations by multiplying multiple deployment combination matrices indicating the multiple deployment combinations by resources matrices corresponding to the pieces of required resource information for respective VNFs.

3. The method of claim 2, wherein detecting the executable deployment combination comprises:
generating a server specification matrix in which the multiple servers are set to values of rows and one or more virtual resource modules included in the specification information are set to values of columns; and
removing a node corresponding to a deployment combination resource matrix, in which a matrix value greater than a matrix value of the server specification matrix is present, from the deployment combination tree.

4. The method of claim 3, wherein detecting the executable deployment combination is configured to detect the network service corresponding to at least one leaf node remaining without being removed after the deployment combination tree has been searched.

5. The method of claim 4, wherein generating the multiple deployment combinations is configured to match depths of the tree with the one or more VNFs in consideration of dependency between the one or more VNFs, based on Network Function Virtualization (NFV) policies.

6. The method of claim 3, wherein removing the node is configured, based on an affinity between the one or more VNFs included in the NFV policies, to remove a node corresponding to a deployment combination resource matrix that violates the affinity from the multiple deployment combination resource matrices.

7. The method of claim 5, wherein the NFV policies comprise details related to at least one of an affinity, a scale, a dependency, High Availability (HA), an instance, a Forwarding Graph (FG), and a virtual link (vlink).

8. The method of claim 1, wherein generating the multiple deployment combinations is configured to generate the deployment combination tree in consideration of energy efficiency, load balancing, a network delay, or a hardware error probability, which are included in a network function virtualization infrastructure policy.

9. The method of claim 3, further comprising:
acquiring information about available resources through the one or more virtual resource modules by considering a larger value of an amount of use of the one or more virtual resource modules monitored on the network and an amount of use of actually allocated resources; and
setting the specification information to correspond to the available resource information.

10. An apparatus for detecting a network service, comprising:
one or more processors that process computer executable program code embodied in non-transitory computer readable storage media,
the computer executable program code to:
generate pieces of required resource information for respective Virtual Network Functions (VNFs) with respect to one or more VNFs provided by a network;
generate multiple deployment combinations by deploying the one or more VNFs on multiple servers constituting the network;
calculate deployment combination resources required by respective multiple deployment combinations, based on the pieces of required resource information for respective VNFs; and
detect an executable deployment combination, among the multiple deployment combinations, as a network service that is capable of being provided by the network by comparing the deployment combination resources with pieces of specification information corresponding to the multiple servers,
wherein the computer executable program code generates a deployment combination tree corresponding to the multiple deployment combinations in such a way as to sequentially match depths of a tree with the one or more VNFs, and detects the network service by searching the deployment combination tree using a breadth-first search method.

11. The apparatus of claim 10, wherein the computer executable program code generates multiple deployment combination resource matrices corresponding to multiple deployment combinations by multiplying multiple deployment combination matrices indicating the multiple deployment combinations by resources matrices corresponding to the pieces of required resource information for respective VNFs.

12. The apparatus of claim 11, wherein the executable program code generates a server specification matrix in which the multiple servers are set to values of rows and one or more virtual resource modules included in the specification information are set to values of columns and removes a node corresponding to a deployment combination resource matrix, in which a matrix value greater than a matrix value of the server specification matrix is present, from the deployment combination tree.

13. The apparatus of claim 12, wherein the computer executable program code detects the network service corresponding to at least one leaf node remaining without being removed after the deployment combination tree has been searched.

14. The apparatus of claim 13, wherein the computer executable program code matches depths of the tree with the one or more VNFs in consideration of dependency between the one or more VNFs, based on Network Function Virtualization (NFV) policies.

15. The apparatus of claim 12, wherein the computer executable program code removes a node corresponding to a deployment combination resource matrix that violates an affinity from the multiple deployment combination resource matrices, based on the affinity between the one or more VNFs included in the NFV policies.

16. The apparatus of claim 14, wherein the NFV policies comprise details related to at least one of an affinity, a scale, a dependency, High Availability (HA), an instance, a Forwarding Graph (FG), and a virtual link (vlink).

17. The apparatus of claim 10, wherein the computer executable program code generates the deployment combination tree in consideration of energy efficiency, load balancing, a network delay, or a hardware error probability, which are included in a network function virtualization infrastructure policy.

18. The apparatus of claim 12, wherein the computer executable program code
acquires information about available resources through the one or more virtual resource modules by considering a larger value of an amount of use of the one or more virtual resource modules monitored on the network and an amount of use of actually allocated resources,
wherein the specification information is set to correspond to the available resource information.

* * * * *